June 22, 1937.     A. J. BECK     2,084,570
JELLY CUTTER
Filed May 31, 1935
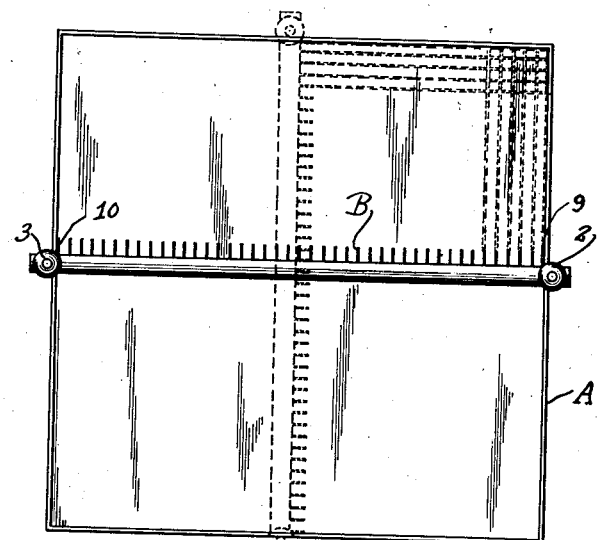
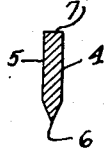
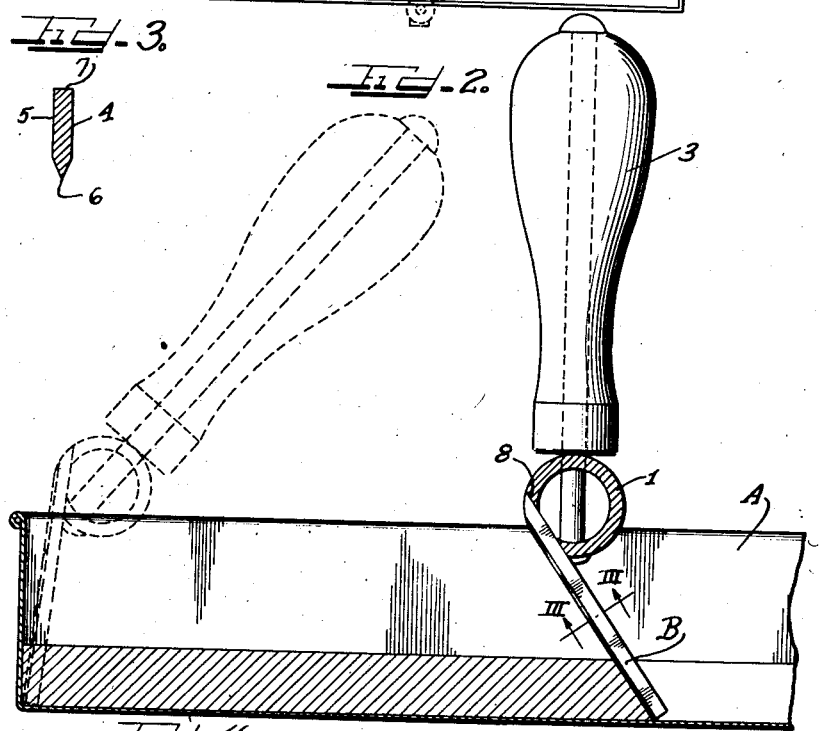
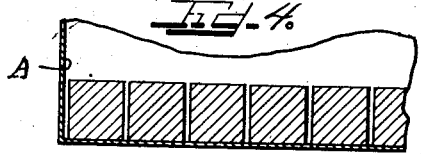
Inventor
Adolph J. Beck.

Patented June 22, 1937

2,084,570

UNITED STATES PATENT OFFICE 2,084,570

JELLY CUTTER

Adolph J. Beck, Chicago, Ill., assignor to National Pectin Products Company, Chicago, Ill., a corporation of Illinois Application May 31, 1935, Serial No. 24,322

1 Claim. (Cl. 30—304)

The present invention relates to a jelly cutter for dicing jellied edible substances.

An object of the present invention is to provide a novel device for slicing layer jellied substances.

A further object of the present invention is to provide a novel device for dicing jellied substances in such manner as to effect sufficient separation between adjacent pieces to enable ready dislodgement of the pieces without accidental sticking together of the pieces.

A still further object of the present invention is to provide a jelly slicer having a novel blade construction to effect separation of adjacent slices sufficient to prevent accidental cohesion of the slices after the slicing operation has been completed.

The present invention has to do with a manually operable jelly slicer comprising a cutting device provided with a plurality of knives, arranged to be drawn through a mass of jelly and severed into a plurality of strips and then moved in another direction through the mass to dice the mass.

Heretofore cutting devices employing wires as the cutting blades have been employed, but without success as it has been found that the jelly mass after passage of the wire blade through the same would stick together thus, in a large measure, overcoming the effectiveness of the slicing operation.

The device of the present invention overcomes the objection incidental to the wire blades by providing blades of substantial thickness and depth, from front to back, so as to slightly compress the jelly as it is cut into strips and prevent sticking together of adjacent strips. The blades are beveled at their leading or cutting edges and the bevels act as ploughs to separate the jelly mass and compress it slightly.

The above, other and further objects of the present invention will be apparent from the following description, accompanying drawing, and appended claim.

The accompanying drawing illustrates a cutting device constructed in accordance with the principles of the present invention, and showing it as utilized with a rectangular pan for dicing the jellied contents of the pan, and the views thereof are as follows:

Figure 1 is a top plan view of a pan showing in dotted lines the position of the cutting device of the present invention arranged for movement through the pan in one direction and in full lines the device arranged for movement in a direction substantially at right angles to that of the first direction of movement.

Figure 2 is a vertical sectional view through a fragmental portion of the pan showing the cutting device of the present invention in cutting position, in full lines in normal operation, and in dotted lines the postion occuped when reaching a wall of the pan in the direction of cutting movement. This view shows also the normal inclined position of the various cutter blades, with respect to the axes of the handles, during the cutting operation.

Figure 3 is an enlarged transverse sectional view taken substantially in the plane indicated by line III—III of Figure 2.

Figure 4 is a fragmental vertical sectional view through some of the sliced pieces of jelly showing the separation between adjacent pieces.

The drawing will now be explained.

A pan A, herein illustrated as rectangular, for convenience, has poured into it a jelly substance, which substance is then allowed to jell, whereupon the cutting device of the present invention is utilized for dicing the layer of jelly so formed.

The illustrated form of cutting device includes a bar 1, herein illustrated as a tube, provided at its ends with handles 2 and 3 for manipulating the device, and along its length with a plurality of cutting blades or knives B. The blades B are spaced, lengthwise of the tube 1, to provide slices of desired width.

The blades B are of greater depth from front to back than thickness and preferably are made with their side surfaces 4 and 5 parallel and with the leading or cutting edges beveled as at 6 to provide plow cutters. The rear margin of a blade 7, is preferably perpendicular to the parallel sides 4 and 5. The blades are formed from rectangular stock suitably beveled to provide the cutting edges 6.

The blades B are mounted in the tube 1 in slots 8 formed in the tube by any suitable means, and arranged preferably so that the lengths of the blades are inclined to the vertical while the axes of the handles 2 and 3 are perpendicular during the cutting operation. That is to say, the lengths of the blades B make obtuse angles with respect to the axes of the handles.

The formation of the blades in the manner stated, and the manner of mounting them in the tube 1 serves to separate the jelly layer as the cutting device is drawn through it. The plow-like cutting edges of the blades tend to separate the material and spread it slightly at each side of every blade thereby compressing the slices of jelly material to an extent that after the blades have passed through the jelly there is sufficient space between adjacent slices to prevent accidental sticking together of the slices or dice as the slices or dice are separated and compressed sufficiently by the blades and, because of the inherent characteristics of the jelly substances to remain compressed for all practical purposes.

The inclination of the blades B, as may be observed from Figure 2, during the cutting operation aids in separating adjacent strips and dice as such inclination retards or prevents any tendency of the surfaces of the jelly to resume the space occupied by it prior to the cutting operation.

The formation and mounting of the blades, in the manner described, overcomes the flowing operation of the jelly where wires are utilized as the cutting blades, as with the blades of the present invention there is no tendency of the jelly to surround the backs of the knives as the knives are drawn through it.

An inspection of Figure 1 will illustrate the manner of utilizing the cutting device of the present invention. There, in full lines, the device appears as being moved through the pan in one direction, from top to bottom, to slice the jellied layer into a plurality of slices extending in one direction of the length of the pan. After the layer has been sliced in this direction, the device is then lifted and moved to the dotted line position of Figure 1, of course adjacent one of the walls of the pan, and then drawn through the jellied layer in a direction substantially perpendicular to its first direction of movement, thereby dicing the jelly within the pan.

The cutting device is supplied with blades, indicated at 9 and 10 in Figure 1, which hug the adjacent walls of the pan to separate the jelly from these walls during the slicing operation, thereby preventing any waste of the jelly.

The full line showing of the cutting device, in Figure 2, is the normal position thereof during the cutting operation. As the device approaches a wall of the pan, it is tilted to the dotted line position of Figure 2 and then lifted out with the blades against the adjacent walls, to completely sever the jelly.

Figure 4 illustrates the separation of the slices or dice of jelly as accomplished by the cutting device of the present invention. It will be seen, at the left-hand portion of this figure, that the strip or dice adjacent the wall of the pan, is spaced from it a distance substantially that of the thickness of a blade, such blade being that indicated at 9 or 10 in Figure 1. The adjacent strips or dice are separated as illustrated which is done by the thickness of other blades of the cutting device operated in the manner heretofore described.

Jelly, diced in the manner herein described, may be very readily removed from the pan by upsetting the pan, whereupon all of the dice fall out of it all separated one from another.

Some manufacturers of confections and ice creams utilize diced jellies for fillers, and the device of the present invention has proved exceptionally desirable with such manufacturers. The device of the present invention makes possible the expeditious and effective dicing of jelly substances so that the dice may be immediately used in connection with other food products, as fillers, without having to manually separate such dice which, by means heretofore employed, have been diced but have become stuck together, due to the unsatisfactory slicing operations of the cutters now in use.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

A device for slicing jellied and like substances comprising a hollow bar having handles adjacent the bar ends with their axes at right angles to the bar axis, said bar having a plurality of parallel slots cut in it and laterally spaced lengthwise of the bar with the lengths of the slots inclined with respect to the axes of the handles in other than right angular relationship, and cutting blades secured in said slots, the inclination of the slots to the axes of the handles causing said blades to trail when the device is used with draw action to slice the jellied substance.

ADOLPH J. BECK.